United States Patent Office 3,825,663
Patented July 23, 1974

3,825,663
METHOD OF COMBATING INSECT PESTS WITH PHENYLCARBAMYLOXYDI*TERT*-BUTYL-BENZYLIDENEMALONONITRILES
John Sanjean, Leawood, and Roger P. Cahoy, Overland Park, Kans., assignors to Gulf Research & Development Company, Pittsburgh, Pa.
No Drawing. Continuation-in-part of application Ser. No. 70,529, Sept. 8, 1970, now Patent No. 3,694,483. This application Mar. 20, 1972, Ser. No. 236,341
Int. Cl. A01n 9/20
U.S. Cl. 424—300      7 Claims

ABSTRACT OF THE DISCLOSURE

N-benzoylcarbamyloxy-, chlorophenylcarbamyloxy- and bromophenylcarbamyloxy - 3,5 - di*tert*.butylbenzylidenemalononitriles are useful in combating a variety of agricultural mites and insect pests, including tobacco budworm, Southern army worm, fall army worm, 2-spotted mite and European corn borer. Particularly useful against tobacco budworm are the 4 - bromo - 3 - chlorophenylcarbamyloxy- and the 2,4 - dichlorophenylcarbamyloxy compounds. For control of European corn borer the N-benzoylcarbamyloxy-, 4 - bromo - 3 - chlorophenylcarbamyloxy- and the 2,4-dichlorophenylcarbamyloxy- compounds are particularly useful. For control of fall army worm the N-benzoylcarbamyloxy- compound is preferred.

This application is a continuation-in-part of U.S. Ser. No. 70,529 filed Sept. 8, 1970, now U.S. Pat. 3,694,483.

DESCRIPTION OF THE INVENTION

U.S. Pat. 3,694,483 is directed to a group of carbamyloxy-di*tert*.butylbenzylidenemalononitrile insecticides having improved safety with respect to warm-blooded animals and a method of cambating Southern corn rootworm with these new insecticides. It has now been discovered that a small group of carbamyloxymalononitriles has interesting utility, particularly for the control of tobacco budworm, a pest which presents a particularly difficult problem. The 3-bromophenyl-, 4-bromophenyl-3-chlorophenyl- and 2,4-dichlorophenylcarbamyloxy compounds are particularly preferred for this purpose.

SYNTHESIS OF THE INSECTICIDES

The novel insecticides of this invention may be synthesized by use of a general procedure chosen from one of those which are exemplified specifically below:

Preparation of 3,5-di*tert*.butyl - 4 - (N-benzoylcarbamyloxy)benzylidenemalononitrile A reaction flask was charged with 13.8 g. (0.049 mole) of 3,5-di*tert*.butyl-4-hydroxybenzylidenemalononitrile, 150 ml. benzene, 7.4 g. (0.05 mole) of benzoyl isocyanate and a catalytic quantity of 1,4-diazabicyclo[2.2.2] octane. The reaction solution was allowed to stir overnight at ambient temperature. On the following morning, the precipitated white-solid material was collected on a vacuum filter and washed with hexane. The compound melted at 155–58° C.
Analysis.—Calcd. for $C_{26}H_{27}N_3O_3$: C, 72.70; H, 6.34; N, 9.78. Found: C, 71.71; H, 6.26; N, 9.77.

Preparation of 3,5-di*tert*.butyl-4-(2,4-dichlorophenylcarbamyloxy)benzylidenemalononitrile The required 2,4-dichlorophenyl isocyanate was prepared by the dropwise addition of 40 g. (0.25 mole) of 2,4-dichloroaniline in 200 ml. of benzene to a stirred solution of 650 ml. of benzene containing 12.5 weight percent phosgene. The mixture was allowed to stir overnight at ambient temperature. On the the following morning, the reaction mixture was refluxed for four hours. The reaction solution was evaporated under reduced pressure. The solid residue was recrystallized from benzene-hexane and collected on a vacuum filter under a nitrogen atmosphere. The compound melted at 57–58° C. A reaction flask was charged with 8.5 g. (0.03 mole) of 3,5-di*tert*.butyl-4-hydroxybenzylidenemalononitrile, 10 ml. of heptane, 7.0 g. (0.037 mole) of 2,4-dichlorophenyl isocyanate and one drop of triethylamine. The stirred reaction mixture was heated at 50° C. for thirty minutes and cooled. The precipitated white solid was collected on a vacuum filter and recrystallized from benzene-hexane. The purified compound melted at 130–131° C.
Analysis.—Calcd. for $C_{25}H_{25}Cl_2N_3O_2$: C, 63.83; H, 5.36; N, 8.93. Found: C, 63.52; H, 5.30; N, 9.19.

USE OF THE PESTICIDES

The effectiveness of the pesticides in use may be measured by means of the test procedures described below:

Anthonomus grandis—boll weevil

Contact—Spray Test: Cages containing ten 2- or 3-day-old laboratory-reared adult boll weevils are exposed in a horizontal wind tunnel to sprays of 5 ml. of acetone solution of the candidate material. Various concentrations up to 0.25% are used to give a range of kills. Four replicates are used to reduce error. Percent moribund and dead is recorded after 24 and 48 hours. Guthion is used as the standard.

Tetranychus urticae—two-spotted spider mite

Spray Test: Cotton seedlings infested (20 or more per plant) with two-spotted spider mites are exposed on a turntable in a wind tunnel to sprays of 5 ml. of an acetone solution of the candidate material. Various concentrations up to 0.25% are used to give a range of kills. Each treatment is replicated 4 times to reduce error. Mortality is recorded after 72 hours. Malathion is used as the standard.

Systemic Test: Cotton seedlings are placed in plant nutrient solution containing various concentrations of the candidate material. Three days later seedlings are infested (20 or more per plant) with two-spotted spider mites. Mortality is recorded 48 hours after the seedlings are infested. Each treatment is replicated 4 times. Demeton is used as the standard.

Spodoptera efridania—southern armyworm

Spray Test: Each side of a cotton leaf is sprayed in a Potter Tower with 5 ml. of acetone solution of the candidate material. After spraying, the leaf is cut in half and each half exposed in a petri dish to 10 fourth-instar larvae. Various concentrations up to 0.25% are used to give a range of kills. Moribund and dead larvae are recorded after 24 and 48 hours. Each treatment is replicated 4 times. Methyl parathion is used as the standard.

Spodoptera frugiperda—fall armyworm

Spray Test: Same method as southern armyworm, except third-instar larvae are used and only 5 per petri dish. Each cotton leaf is cut in four equal parts.

Heliothis virescens—tobacco budworm

Same method as fall armyworm.

Laboratory screening of crop protection chemicals on the European corn borer Candidate compounds are compared by confining 7-day-old European corn borer larvae on an artificial medium that has been treated with the candidate compound.
The media treated with candidate compounds are prepared by dissolving 100 mg. of the active compound in 10 ml. of acetone containing 10 mg. of Triton X-155 emulsifier. Ninety ml. of distilled water is then added to the emulsifiable concentrate, yielding a 1000 p.p.m. dilution of the active chemical. The desired concentrations are then serially diluted from the 1000 p.p.m. solution. Each cup receives 0.2 ml. of the dilution.

Plastic jelly cups (18 mm. deep x 26 mm. bottom diam. x 34 mm. top diam.) are used for test containers. An automatic pipette is used to apply the solution on the surface of the artificial medium. Five 7-day-old larvae are introduced into each cup and confined by means of a paper-board cap lined with Saran. Each treatment is replicated 4 times and all treatments are held at 80° F. and mortality counts are made after 72 hrs. and percentage mortality is then determined.

The rating of the best results is done as follows:

A=76—100% dead adults
B=51—75% dead adults
C=26—50% dead adults
D=1—25% dead adults
E=no dead adults

| Compound | Concen. (p.p.m.) | Tobacco budworm | Southern armyworm | Fall armyworm | Two-spotted mite | Boll weevil | European corn borer |
|---|---|---|---|---|---|---|---|
| Ph-C(O)-NH-C(O)-O-(2,6-di-t-Bu-phenyl)-CH=C(CN)₂ | 2,500 | A | A | A | A | C | |
| | 1,000 | A | B | A | A | D | A |
| | 500 | D | B | A | A | | A |
| | 250 | | | | | | A |
| | 125 | | | | | | A |
| | 100 | | D | A | C | | |
| | 62.5 | | | | | | A |
| | 31.3 | | | | | | B |
| | 10 | | | D | | | |
| 4-Br-3-Cl-C₆H₃-NH-C(O)-O-(2,6-di-t-Bu-phenyl)-CH=C(CN)₂ | 2,500 | A | A | A | A' | D | |
| | 1,000 | A | A | A | A | | A |
| | 500 | A | C | A | A | | A |
| | 250 | | | | | | A |
| | 125 | | | | | | A |
| | 100 | B | | C | E | | |
| | 62.5 | | | | | | B |
| | 31.3 | | | | | | C |
| | 10 | E | | | | | |
| 2,4-Cl₂-C₆H₃-NHC(O)O-(2,6-di-t-Bu-phenyl)-CH=C(CN)₂  LD₅₀ 18.4 to 34.9 (avg. 26.6) mg./kg. | 2,500 | A | A | A | | C | |
| | 1,000 | A | A | A | | | A |
| | 500 | A | B | A | | | A |
| | 250 | | B | | A-B | | A |
| | 125 | | D | | A-C | | A |
| | 100 | D | D | B | | | |
| | 62.5 | | | | B-C | | A |
| | 31.3 | | | | D | | B |
| | 10 | | | E | | | |
| 3-Br-C₆H₄-NH-C(O)-O-(2,6-di-t-Bu-phenyl)-CH=C(CN)₂ | 2,500 | A | A | A | C | C | |
| | 1,000 | A | B | A | | | |
| | 500 | B | C | A | | | |
| | 250 | | | | | | |
| | 125 | | | | | | |
| | 100 | C | | C | | | |
| | 62.5 | | | | | | |
| | 31.3 | | | | | | |
| | 10 | | | | | | |
| Comparison Standards | | | | | | | |
| HO-(2,6-di-t-Bu-phenyl)-CH=C(CN)₂  LD₅₀ 6.5-28 (avg. 17.2) mg./kg. | 2,500 | A | A | A | A | D | |
| | 1,000 | A | A | A | A | | A |
| | 500 | A | A | B | A | | A |
| | 250 | | | | | | A |
| | 125 | | | | | | A |
| | 100 | C | C | B | A | | |
| | 62.5 | | | | | | A |
| | 31.3 | | | | | | A |
| | 10 | | | | | | |
| Methyl parathion | 2,500 | A-A | | | | | |
| | 1,000 | A-A | | | | | |
| | 500 | A-A | A-A | A-A | | | |
| | 250 | B-C | | | | | |
| | 125 | | | | | | |
| | 100 | | A-B | A-A | | | |
| | 62.5 | | | | | | |
| | 31.3 | | | | | | |
| | 10 | | D-E | A-D | | | |
| Malathion | 2,500 | | | | A-A | | |
| | 1,000 | | | | B-B | | |
| | 500 | | | | | | |
| | 250 | | | | | | |
| | 125 | | | | | | |
| | 100 | | | | D-D | | |
| | 62.5 | | | | | | |
| | 31.3 | | | | | | |
| | 10 | | | | | | |
| Guthion | 2,500 | | | | | C-C | |
| | 1,000 | | | | | D-C | |
| | 500 | | | | | D-C | |
| | 250 | | | | | | |
| | 125 | | | | | | |
| | 100 | | | | | | |
| | 62.5 | | | | | | |
| | 31.3 | | | | | | |
| | 10 | | | | | | |
| DDT | 2,500 | | | | | | |
| | 1,000 | | | | | | |
| | 500 | | | | | | |
| | 250 | | | | | | |
| | 125 | | | | | | A |
| | 100 | | | | | | |
| | 62.5 | | | | | | B |
| | 31.3 | | | | | | C |
| | 10 | | | | | | |

As indicated by the tabulated table, the novel compounds of this invention possess high toxicity particularly to tobacco budworm and European corn borer while possessing a better margin of safety with respect to toxicity to warm-blooded animals than the prior art 3,5-di*tert*.butyl-4-hydroxybenzylidenemalononitrile.

In the typical method of use, the insecticides are formulated as liquid spray mixtures according to conventional techniques and are applied to the plants at intervals during the growing season.

We claim:

1. A method of killing insect larvae and mites comprising applying to plant foliage an insecticidally effective amount of a compound selected from the group consisting of 3,5-di-*tert*.butyl-4-(2,4-dichlorophenylcarbamyloxy)benzylidenemalononitrile 3,5-di-*tert*.butyl-4-(N-benzoylcarbamyloxy)benzylidenemalononitrile 3,5-di-*tert*.butyl-4-(4-bromo-3-chlorophenylcarbamyloxy)benzylidenemalononitrile and 3,5-di-*tert*.butyl-4-(3-bromophenylcarbamyloxy)benzylidenemalononitrile 2. A method of killing tobacco budworm comprising applying to the foliage of tobacco plants an insecticidally effective amount of 3,5-di*tert*.butyl-4-(4-bromo-3-chlorophenylcarbamyloxy)benzylidenemalononitrile.

3. A method of killing tobacco budworm comprising applying to the foliage of tobacco plants an insecticidally effective amount of 3,5-di*tert*.butyl-4-(3-bromophenylcarbamyloxy)benzylidenemalononitrile.

4. A method of killing tobacco budworm comprising applying to the locus of the tobacco budworms an insecticidally effective amount of 3,5-di*tert*.butyl-4-(2,4-dichlorophenylcarbamyloxy)benzylidenemalononitrile.

5. A method of killing European corn borer comprising applying to the locus of the corn borer larvae an insecticidally effective amount of 3,5-di*tert*.butyl-4-(2,4-dichlorophenylcarbamyloxy)benzylidenemalononitrile.

6. A method of killing European corn borer comprising applying to the locus of the corn borer larvae an insecticidally effective amount of 3,5-di*tert*.butyl-4-(N-benzoylcarbamyloxy)benzylidenemalononitrile.

7. A method of killing fall army worm comprising applying to the foliage of the plants infested with fall army worm an insecticidally effective amount of 3,5-di*tert*.butyl-4-(N-benzoylcarbamyloxy)benzylidenemalononitrile.

References Cited
UNITED STATES PATENTS

| | | | |
|---|---|---|---|
| 3,527,785 | 9/1970 | Ozaki et al. | 260—465 F |
| 3,694,483 | 9/1972 | Cahoy et al. | 424—300 X |

ALBERT T. MEYERS, Primary Examiner

L. SCHENKMAN, Assistant Examiner